United States Patent [19]

Ohe et al.

[11] Patent Number: 4,477,303
[45] Date of Patent: Oct. 16, 1984

[54] PROCESS FOR PREPARATION OF SURFACE-PROTECTING ACRYLIC FILM

[75] Inventors: Makoto Ohe; Koichiro Sugi, both of Tokyo, Japan

[73] Assignee: Mitsubishi Rayon Co., Ltd., Tokyo, Japan

[21] Appl. No.: 345,357

[22] Filed: Feb. 3, 1982

[30] Foreign Application Priority Data

Feb. 13, 1981 [JP] Japan .................. 56-19806
Feb. 16, 1981 [JP] Japan .................. 56-21269
Feb. 17, 1981 [JP] Japan .................. 56-22038

[51] Int. Cl.$^3$ .................. B44C 1/00; B32B 7/00; B32B 7/04; B32B 27/32
[52] U.S. Cl. .................. 156/230; 156/310; 156/332; 428/420; 428/523
[58] Field of Search .................. 156/230, 236, 238, 249, 156/334, 307.7, 307.3, 310, 332, 315, 234; 428/420, 520, 42, 43, 202, 523; 427/399, 400; 525/170, 193

[56] References Cited

U.S. PATENT DOCUMENTS

| | | | |
|---|---|---|---|
| 3,562,235 | 2/1971 | Ryan | 525/193 |
| 4,131,635 | 12/1978 | Wilschut | 525/170 |
| 4,243,462 | 1/1981 | Hori et al. | 156/310 |
| 4,254,186 | 3/1981 | Acitelli et al. | 156/230 |
| 4,333,987 | 6/1982 | Kwart et al. | 428/420 |
| 4,339,485 | 7/1982 | Shibano et al. | 156/334 |
| 4,361,626 | 11/1982 | Boba et al. | 428/420 |
| 4,367,312 | 1/1983 | Bontinck et al. | 428/520 |
| 4,379,039 | 4/1983 | Fujimoto et al. | 156/332 |

*Primary Examiner*—Edward Kimlin
*Assistant Examiner*—Louis Falasco
*Attorney, Agent, or Firm*—Cushman, Darby & Cushman

[57] ABSTRACT

An improved process for preparing a laminate polymer article having an alkyl methacrylate polymer film uniformly laminated on at least one surface of the body of a polymer article formed from a prepolymer composition containing a polymerizable monomer, a solvent or a mixture thereof is disclosed. A composite acrylic film comprising (a) a carrier film insoluble in the polymerizable monomer and the solvent and (b) an alkyl methacrylate polymer film soluble in or swellable with the polymerizable monomer and the solvent, said carrier film and said alkyl methacrylate polymer film being adhered to each other through an adhesive layer capable of adhering relatively weakly to the alkyl methacrylate film and adhering relatively strongly to the carrier film and incapable of being dissolved in the polymerizable monomer and the solvent, is laminated on the prepolymer composition so that the alkyl methacrylate polymer film is in contact with the surface of the prepolymer composition; the prepolymer composition is polymerized; and then, the carrier film is peeled together with the adhesive layer from the resulting polymer article.

5 Claims, 3 Drawing Figures

PROCESS FOR PREPARATION OF
SURFACE-PROTECTING ACRYLIC FILM

BACKGROUND OF THE INVENTION

1. Field of the Invention

This invention relates to a process for preparing laminate polymer articles. More particularly, it relates to a process for preparing laminate polymer articles, wherein a composite acrylic film comprised of an alkyl methacrylate polymer film and a carrier film is laminated on at least one surface of a prepolymer containing a polymerizable monomer and/or a solvent, such as a fiber-reinforced unsaturated polyester (hereinafter referred to as "FRP" for brevity) prepolymer, so that the surface of the alkyl methacrylate polymer film is in contact with the prepolymer; the prepolymer is polymerized and cured; and then, the carrier film is peeled from the composite acrylic film to obtain a laminate polymer article having the alkyl methacrylate polymer film as a surface protecting layer. The present invention also relates to a composite acrylic film which is used in the above-mentioned process as a surface protecting layer for a polymer article.

2. Description of the Prior Art

Thermoplastic resins such as ABS resins, vinyl chloride polymer resins and polycarbonate resins are poor in the weatherability, and as is well-known, as means for improving this poor weatherability, there has been adopted a method in which an acrylic film is heat-bonded or bonded by an adhesive to the surface of a final product at the shaping step.

Plane sheets and corrugated sheets of FRP are used indoors and outdoors in large quantities as construction materials, green house materials, road materials and industrial materials, because they are excellent in the strength and have a light weight.

However, when FRP shaped articles are used outdoors for a long time, so-called "volume decrease", that is, the phenomenon in which glass fibers are exposed to the surface of the shaped article by erosion of the unsaturated polyester resin, takes place, resulting in loss of clarity and separation of the glass fibers from the FRP resin, and therefore, the reinforcing effect by the glass fibers is drastically reduced. Moreover, by long-time outdoor use, the unsaturated polyester resin per se is yellowed, and hence, in case of an uncolored transparent shaped article, the light transmittance is drastically reduced and in case of a colored shaped article, there arises discoloration or color fading which is a fatal defect in a green house material. As means for improving the weatherability of FRP shaped articles, there have been adopted a process in which a gel coat is formed on the surface of a mold and cast polymerization is carried out in this mold and a shell molding process in which acrylic resin plates are molded and cast polymerization is carried out between inner surfaces of the molded acrylic resin plates. These processes, however, are defective in that the thickness of the acrylic resin layer applied to the surface of the molded article is too large, and application of such acrylic resin layer to a plane having a broad area is economically disadvantageous and is not preferred in view of the operation environment.

As means for eliminating these disadvantages, there has been proposed a method in which a poly(vinyl fluoride) film which has been subjected to a discharge treatment is superposed and bonded on the surface of an FRP shaped article. However, this method is still not satisfactory in that bonding of the poly(vinyl fluoride) film to FRP is insufficient and the poly(vinyl fluoride) film tends to be peeled while the FRP shaped article is being used. Furthermore, there is adopted a method in which a paint having a good weatherability is coated on the surface of an FRP shaped article, but this method is low in the productivity and economically disadvantageous when this method is applied to the production of large-area, mass-production type FRP sheet-like shaped articles such as plane sheets and corrugated sheets.

By laminating or coating an acrylic film excellent in the weatherability on the surface of an FRP shaped article, the weatherability of the FRP shaped article can remarkably be improved and occurrence of the above-mentioned phenomenon of "volume decrease" and coloration, discoloration and fading of the resin per se can be prevented. However, in the continuous process for the preparation of FRP plane sheets or corrugated sheets, if an acrylic film is expanded on a carrier film, glass fibers are scattered thereon and an unsaturated polyester syrup is injected therein, the acrylic film is dissolved within several seconds by a styrene monomer contained in the syrup and is locally broken, perforated or shrunk. Moreover, since such laminate is heated at a high temperature at the molding step, the surface smoothness cannot be maintained in the film and it is impossible to uniformly bond the acrylic film only to the surface layer of the shaped article, with the result that the finished surface becomes marked with blobs and crepy and it is impossible to form a uniform surface protecting layer.

SUMMARY OF THE INVENTION

It is a primary object of present invention to provide a laminate polymer article having a protecting alkyl methacrylate polymer layer on the surface thereof, said protecting alkyl methacrylate polymer layer being uniformly and strongly adhered to the body of the polymer article and said laminate polymer article having excellent weatherability and stain resistance.

Other objects and advantages of the present invention will be apparent from the following description.

In accordance with the present invention, there is provided an improved process for preparing a laminate polymer article having an alkyl methacrylate polymer film uniformly laminated on at least one surface of the body of a polymer article formed from a prepolymer composition containing a polymerizable monomer, a solvent or a mixture thereof. The improvement resides in the steps of (i) laminating on the prepolymer composition a composite acrylic film comprising (a) a carrier film insoluble in the polymerizable monomer and the solvent and (b) an alkyl methacrylate polymer film soluble in or swellable with the polymerizable monomer and the solvent, said carrier film and said alkyl methacrylate polymer film being adhered to each other through an adhesive layer capable of adhering relatively weakly to the alkyl methacrylate film and adhering relatively strongly to the carrier film and incapable of being dissolved in the polymerizable monomer and the solvent, so that the alkyl methacrylate polymer film is in contact with the surface of the prepolymer composition; (ii) polymerizing the prepolymer composition; and then, (iii) peeling the carrier film together with the adhesive layer from the resulting polymer article.

DESCRIPTION OF THE PREFERRED EMBODIMENTS

Figure 1:
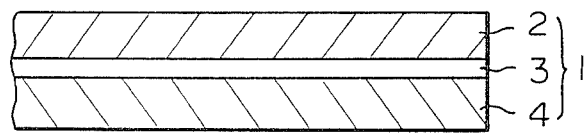
FIG. 1 is a sectional view illustrating a composite acrylic film for protecting a polymer article surface, which film can be used for carrying out the process of the present invention.

As the alkyl methacrylate polymer film (hereinafter referred to as "acrylic film" for brevity) constituting the composite acrylic film used in the process of the present invention, there can be mentioned unstretched and stretched films composed of poly(alkyl methacrylates), copolymers of an alkyl methacrylate with at least one other copolymerizable monomer and polymers as disclosed in Japanese patent publication Nos. 13,371/72, 46,158/74, 46,159/74, 26,901/77 and 33,277/79, Japanese Laid-open patent application Nos. 129,449/76 and 56,150/77, and U.S. Pat. Nos. 3,562,235 and 4,052,525. The carbon number of the alkyl group contained in the alkyl methacrylate polymer is preferably 1 through 8. These films are composed mainly of alkyl methacrylates and are excellent in the weatherability. The thickness of such acrylic film is not particularly limited, but the thickness is ordinarily in the range of from about 20 to about 200 microns in view of protection of the surface of the final product. The acrylic film is dissolved in or swollen with a monomer such as styrene or methyl methacrylate or a solvent such as toluene, xylene or ethyl acetate, though the degree of dissolution or swelling varies to some extent according to the particular polymer constituting the acrylic film.

The carrier film which is the other constituent of the composite acrylic film is incapable of being dissolved in the above-mentioned monomers and solvents, and as the carrier film, there can be mentioned, for example, a saturated polyester film, a polyethylene film, a polypropylene film, a polyvinyl alcohol film, a polyamide film, a cellophane film, a poly(vinyl chloride) film and a poly(vinylidene chloride) film. Among these films, a saturated polyester film is especially preferred. The thickness of the carrier film may be in the range of from about 10 to about 100 microns.

In the composite acrylic film used in the present invention, the above-mentioned acrylic film and carrier film are laminated to each other through an adhesive layer. The adhesive of this adhesive layer is incapable of being dissolved in the above-mentioned monomers and solvents and has such a bonding characteristic that the adhesive adheres relatively weakly to the acrylic film but relatively strongly to the carrier film. More specifically, the adhesive of the adhesive layer provides between the acrylic film and the carrier film a bonding strength lower than 100 g/25 mm of the width, preferably 5 to 20 g/25 mm of the width, as determined according to the 180° peel test according to ASTM D 903-49. A vinyl chloride-vinyl acetate-alkyl acrylate emulsion is especially preferred, though the applicable adhesive is not limited to such emulsion. In short, any adhesive satisfying the above requirements can be used in the present invention. If an adhesive satisfying the above requirements is employed, there can be attained the following prominent advantage. That is, when the carrier film is peeled after the acrylic film has been laminated to be bonded to a polymer article such as an FRP shaped article, the adhesive is not left on the acrylic film but is entirely removed in the state where the adhesive is applied to the carrier film.

The above-mentioned composite acrylic film can easily be obtained by coating the adhesive on the surface of the carrier film, superposing the acrylic film on the adhesive-coated carrier film and press-bonding the films.

In the present invention, the composite acrylic film is used in composition the same manner as a cast film is used in the conventional technique. More specifically, the composite acrylic film is superposed on at least one surface of a sheet of a prepolymer composition, for example, a polymerizable syrup containing a polymerizable monomer or solvent, such as an FRP prepolymer composition containing a styrene monomer, so that the acrylic film face of the composite acrylic film is in contact with the prepolymer composition, whereby only the acrylic film is dissolved in or swollen with the monomer such as styrene or the solvent contained in the prepolymer composition. When the prepolymer composition is polymerized at the subsequent step, the acrylic film is completely laminated and bonded to the resulting polymer article (such as FRP molded article), whereby there is obtained a shaped polymer article having an acrylic film layer formed on one surface or both the surfaces of the polymer article. The carrier film is peeled from the surface of the polymer article as occasion demands. At this time, the adhesive layer interposed between the carrier film and the acrylic film can be simultaneously peeled in the state adhering to the carrier film, because the adhesive layer has the above-mentioned bonding characteristics. Accordingly, the adhesive is not left on the surface of the laminate polymer article, for example, an FRP shaped article, but the acrylic film is left in the state laminated and bonded to the polymer article. Therefore, dusts and the like do not adhere to the polymer article, and there is obtained a shaped article excellent in the weatherability and stain resistance. Furthermore, since the acrylic film is secured to the carrier film through the adhesive layer, shrinkage or deformation of the acrylic film is not caused at the step of polymerizing the FRP prepolymer composition. Moreover, since the smooth surface of the carrier film is reproduced on the surface of the FRP shaped article, the resulting shaped article has the smooth surface which is neither marked with blobs nor crepy and which is far superior to the surface of the conventional FRP articles.

One embodiment of the present invention, which is directed to the manufacture of a polyester decorative plate, will now be described with reference to the accompanying drawings.

Figure 2:
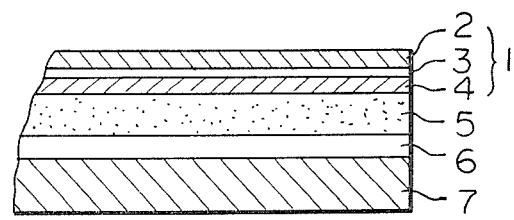
FIGS. 2 and 3 are diagrams illustrating one embodiment of the process for the preparation of laminate polymer articles according to the present invention.
Figure 3:
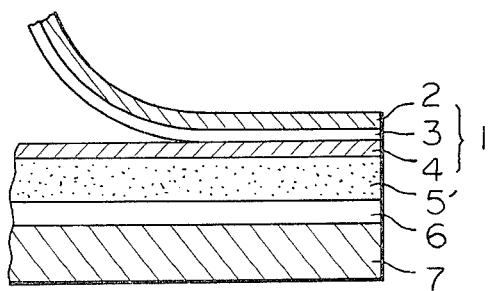

Referring to FIG. 2, an unsaturated polyester syrup 5 is cast on the surface of a titanium paper 6 having various patterns printed thereon, which is applied to the surface of wood 7 and a composite acrylic film 1 having a laminate structure of acrylic film 4/adhesive layer 3/carrier film 2 is laminated on the syrup 5 so that the acrylic film 4 is in contact with the polyester syrup 5. An enlarged cross-section of the composite acrylic film 1 is illustrated in FIG. 1. After the polymerization of the polyester syrup 5, the carrier film 2 is peeled from the laminate structure as illustrated in FIG. 3. In FIG. 3, reference numeral 5' represents the polymerized and cured polyester. The adhesive layer 3 is peeled and removed in the state adhering to the carrier film 2. Since the acrylic film 4 is strongly bonded to the surface of the obtained polyester decorative sheet, the acrylic film 4 is not separated from the decorative sheet and the surface of the decorative sheet is uniformly smooth. Furthermore, the adhesive is not left on the surface of the decorative sheet, dusts and other foreign matters do not adhere to the surface of the decorative sheet. Therefore, excellent weatherability and stain resistance can be imparted to the decorative sheet.

The above-mentioned composite acrylic film of the present invention can be used for protecting the surface, improving the weatherability and also improving the appearance in not only the above-mentioned FRP shaped articles but also prepolymer-impregnated fabrics and glass bead-embedded returnable reflective sheets.

The present invention will now be described in detail with reference to the following Examples that by no means limit the scope of the invention.

EXAMPLE 1

A vinyl chloride/vinyl acetate/acrylate copolymer emulsion adhesive (marketed under the tradename of "MR-01" by Nisshin Kagaku and having a solid content of 44%) was coated in an amount of about 25 g/m$^2$ on a commercially available, biaxially stretched polyester film having a thickness of 25 microns as a carrier film by a bar coater, and the coated film was dried in an oven maintained at 70 to 80° C. for 2 to 4 minutes.

By using a nip roller, an acrylic film having a thickness of 50 microns, which was obtained by melt-extruding a polymer shown in Run No. 21 of Table 4 of the specification of U.S. Pat. No. 4,052,525 according to customary procedures, was pressed to be laminated on the adhesive layer, to form a composite acrylic film 1.

The appearance of the composite film 1 had no defect and the film 1 was excellent in the transparency. The section of the composite film 1 was as shown in FIG. 1, in which reference numerals 2, 3 and 4 represent the carrier film, the adhesive layer and the acrylic film, respectively.

When the polyester film used was contacted with absorbent cotton impregnated with a styrene monomer, the film was not changed by the styrene monomer at all. When the acrylic film was similarly tested, the contact portion was selectively dissolved within one minute.

Ten strip-like specimens each having a width of 25 mm were taken from the so-obtained composite film and the 180° peel strength was measured by a Tensilon tester according to the method of ASTM D 903-49. The peel strength was in the range of from 8 to 18 g/25 mm of the width in the ten specimens, and the average peel strength was 13.4 g/25 mm of the width.

Ten specimens each having a size of 50 mm×50 mm were taken from a different part of the composite film, and the peeling state was examined with the naked eye. In all the specimens, peeling was easily accomplished and the adhesive layer was not left on the acrylic film at all.

The composite film was spread on a glass sheet so that the acrylic film 4 was located above, and according to customary procedures, 25 parts by weight of glass fibers (Chopped Strand 824A supplied by Asahi Fiber K. K.) were scattered on the surface of the acrylic film and 75 parts by weight of an unsaturated polyester syrup (POLYMAR 2207U supplied by Takeda Yakuhin Kogyo K. K.) and 0.1 part by weight of benzoyl peroxide were cast on the glass fibers to impregnate the glass fibers with the unsaturated polyester syrup. Furthermore, another composite film was spread on the unsaturated polyester syrup so that the surface of the acrylic film was contacted with the syrup and a glass sheet was placed on the composite film so that the thickness of the laminate was 1 mm. The laminate was placed in a hot air circulating oven maintained at 90° C. for 20 minutes to effect curing and polymerization. The cured product was then taken out from the oven and air-cooled at room temperature, and the glass sheets were then removed.

The polyester films, that is, carrier films, adhering to both the surfaces of the obtained FRP sheet having a thickness of 1 mm, could easily be peeled from the end portions thereof in the adhesive layer-adhering state, and the surfaces of the FRP sheet after peeling of the polyester films were very smooth and were free of surface defects such as blobs or wrinkles.

For comparison, the so-obtained FRP sheet (A) and an ordinary FRP sheet (B) which was prepared in the same manner as described above except that the acrylic film was not laminated on the surface were subjected to an accelerated exposure test for 500 hours, and the surface conditions of these FRP sheets were examined. Formation of fine cracks and whitening were observed on the surface of the ordinary FRP sheet (B), and undesirable raising of the glass fibers took place and the FRP sheet per se was yellowed to some extent. In contrast, no change was observed on the FRP sheet (A). Ten cut lines were formed at intervals of 1 mm in either the longitudinal or lateral direction on the surface of the exposed FRP sheet (A) by a knife to form 81 squares (each 1 mm×1 mm size) and an adhesive cellophane tape was applied to the cut surface, and the peel test was then carried out. None of squares were peeled from the surface of the FRP sheet (A).

COMPARATIVE EXAMPLE 1

The acrylic film having a thickness of 50 microns, which was used in Example 1, was spread on a glass sheet and air present between the film and glass sheet was removed by a squeeze roll. The same glass fibers, unsaturated polyester syrup and benzoyl peroxide as used in Example 1 were employed in the same amounts as in Example 1. Namely, the glass fibers were first scattered and the unsaturated polyester syrup and benzoyl peroxide were cast on the glass fibers to effect impregnation. During the impregnation operation, the acrylic film was non-uniformly dissolved by the styrene monomer contained in the syrup, and the syrup was intruded between the acrylic film and the glass sheet here and there and the undissolved film was curled up in the crepy state.

The same polyester film as used in Example 1 was spread on the syrup so that the polyester film was in contact with the syrup, and a glass sheet was then placed on the laminate so that the thickness of the laminate was 1 mm. Then, the laminate was heated in a hot air circulating oven maintained at 90° C. for 20 minutes to effect polymerization and curing. Then, the cured product was taken out from the oven and air-cooled at room temperature, and the glass sheets were removed.

The acrylic film-laminated surface of the obtained FRP sheet having a thickness of 1 mm was poor in the surface smoothness and was marked with blobs and crepy. Furthermore, the acrylic film was locally shrunk and opaque portions were observed here and there. The polyester film on the opposite surface was easily peeled and there was obtained a smooth surface free of surface defects.

COMPARATIVE EXAMPLE 2

The same polyester film as used in Example 1 was spread on a glass sheet and the same acrylic film was spread on the polyester film, and air present between the films was expelled by a squeeze roll. In the same manner as described in Example 1, glass fibers were scattered in the same amount as in Example 1, and the unsaturated polyester syrup and benzoyl peroxide were cast in the same amounts as in Example 1 to effect impregnation. A phenomenon apparently similar to the phenomenon observed in Comparative Example 1 took place, and the acrylic film was locally dissolved, swollen and shrunk by the styrene monomer.

The same polyester film as used in Example 1 was spread on the syrup so that the polyester film was in contact with the syrup, and a glass sheet was placed on the laminate so that the thickness of the laminate was 1 mm. Then, the laminate was heated in a hot air circulating oven maintained at 90° C. for 20 minutes to effect polymerization and curing, and the cured product was air-cooled at room temperature and the glass sheets were removed.

The polyester films adhering to both the surfaces of the obtained FRP sheet were easily removed, but the acrylic film surface was marked with blobs and crepy as in Comparative Example 1 and the acrylic film surface was not smooth and was locally opaque.

EXAMPLE 2

A composite film was prepared by laminating a biaxially stretched polypropylene film having a thickness of 15 microns as a carrier film on an acrylic film having a thickness of 35 microns, which was prepared from the same polymer as used in Example 1, by using the same adhesive as used in Example 1.

When the peel strength of the composite film was measured in the same manner as described in Example 1, it was found that the peel strength was 6 to 10 g/25 mm of the width. When the peel state was observed with the naked eye, it was found that the adhesive was not left on the acrylic film at all.

The composite film was spread on a glass sheet so that the acrylic film surface was located above, and a cotton fabric was horizontally placed on the acrylic film surface. Great excess of a syrup comprising 100 parts by weight of the same unsaturated polyester syrup as used in Example 1 and 0.1 part by weight of benzoyl peroxide was sufficiently spread on the cotton fabric by using a bamboo spatula to effect impregnation. Then, the excessive syrup was removed by squeezing, and the above-mentioned composite film was spread on the syrup so that the acrylic film surface of the composite film was in contact with the syrup. Then, a glass sheet was placed on the composite film and clamped thereto by a paper clip. The assembly was heated in a hot air circulating oven maintained at 90° C. for 20 minutes to effect polymerization and curing, and the cured product was taken out from the oven and air-cooled and the glass sheets were removed. The biaxially stretched polypropylene films adhering to both the surfaces of the unsaturated polyester-impregnated fabric were peeled and removed, and there was obtained a sheet (C) having smooth surfaces.

For comparison, a laminate sheet was prepared in the same manner as described above except that the above-mentioned biaxially stretched polypropylene films alone were used instead of the above-mentioned composite films, and the polypropylene films were peeled to obtain an unsaturated polyester-impregnated fabric sheet (D).

The above samples (C) and (D) were subjected to an accelerated exposure test for 500 hours, and the surface conditions were examined with the naked eye. No change was found on the surfaces of the sample (C). In contrast, it was found that a great number of fine cracks were formed on the surfaces of the sample (D).

Ten cut lines were formed at intervals of 1 mm on the surface of the sample (C) in either the longitudinal direction or the lateral direction to form 81 squares, and an adhesive cellophane tape was applied to the cut surface and the peel test was carried out. None of the squares were peeled.

EXAMPLE 3

A vinyl chloride/vinyl acetate/acrylate copolymer emulsion adhesive (marketed under the tradename of "MR-01" by Nisshin Kagaku and having a solid content of 44%) was coated in an amount of about 30 g/m² on a biaxially stretched polyester film having a thickness of 30 microns as a carrier film by a bar coater, and the coated film was dried in an oven maintained at 70° to 80° C. for 3 to 5 minutes.

By using a nip roller, an acrylic film having a thickness of 55 microns, which was obtained by melt-extruding a polymer shown in Run No. 21 of Table 4 of the specification of U.S. Pat. No. 4,052,525 according to customary procedures, was pressed to be laminated on the adhesive layer, to form a composite acrylic film.

When the polyester film used was contacted with absorbent cotton impregnated with a styrene monomer, the film was not changed by the styrene monomer at all. When the acrylic film was similarly tested, the contact portion was selectively dissolved within one minute.

Ten strip-like specimens each having a width of 25 mm were taken from the so-obtained composite film and the 180° peel strength was measured by a Tensilon tester according to the method of ASTM D 903-49. The peel strength was in the range of from 9 to 20 g/25 mm of the width in the ten specimens, and the average peel strength was 14.7 g/25 mm of the width.

Ten specimens each having a size of 50 mm×50 mm were taken from a different part of the composite film, and the peeling state was examined with the naked eye. In all the specimens, peeling was easily accomplished and the adhesive layer was not left on the acrylic film at all.

The composite film was spread on a glass sheet so that the acrylic film was located above, and according to customary procedures, 20 parts by weight of glass fibers (Chopped Strand 824A supplied by Asahi Fiber K. K.) were scattered on the surface of the acrylic film and 80 parts by weight of an unsaturated polyester syrup (POLYMAR 2207U supplied by Takeda Yakuhin Kogyo K. K.) and 0.1 part by weight of benzoyl peroxide were cast on the glass fibers to impregnate the glass fibers with the unsaturated polyester syrup. Furthermore, another composite film was spread on the unsaturated polyester syrup so that the surface of the acrylic film was contacted with the syrup and a glass sheet was placed on the composite film so that the thickness of the laminate was 1 mm. The laminate was placed in a hot air circulating oven maintained at 90° C. for 25 minutes to effect curing and polymerization. The cured product was then taken out from the oven and air-cooled at room temperature, and the glass sheets were then removed.

The polyester films, that is, carrier films, adhering to both the surfaces of the obtained FRP sheet having a thickness of 1 mm, could easily be peeled from the end portions thereof in the adhesive layer-adhering state, and the surfaces of the FRP sheet after peeling of the polyester films were very smooth and were free of surface defects such as blobs or wrinkles.

For comparison, the so-obtained FRP sheet (A) and a comparative FRP sheet (B) which was prepared in the same manner as described above except that a polyester film having a thickness of 25 microns was used instead of the composite acrylic film were subjected to an accelerated exposure test for 500 hours, and the surface conditions of these FRP sheets were examined. Formation of fine cracks and whitening were observed on the surface of the comparative FRP sheet (B), and undesirable raising of the glass fibers took place. Furthermore, the FRP sheet per se was slightly yellowed. In contrast, no change was observed on the FRP sheet (A). Ten cut lines were formed at intervals of 1 mm in either the longitudinal or lateral direction on the surface of the exposed FRP sheet (A) by a knife and an adhesive cellophane tape was applied to the cut surface, and the peel test was then carried out. None of squares were peeled from the surface of the FRP sheet (A).

EXAMPLE 4

A vinyl chloride/vinyl acetate/acrylate copolymer emulsion adhesive (marketed under the tradename of "MR-01" by Nisshin Kagaku and having a slid content of 44) was coated in an amount of about 25 g/m² on biaxially stretched polyester film having a thickness of 25 microns as a carrier film by a bar coater, and the coated film was dried in an oven maintained at 70° to 80° C. for 2 to 4 minutes.

A polymer shown in Run No. 21 of Table 4 of the specification of U.S. Pat. No. 4,052,525 and having incorporated therein 1% of an ultraviolet absorber ("TINUVIN P" supplied by Ciba-Geigy A.G.) was melt-extruded according to a conventional procedure to obtain an acrylic film having a thickness of 50 microns. This acrylic film was pressed by using nip roller thereby to be laminated on the above-mentioned adhesive coating layer to form a composite acrylic film. The composite film had no surface defects and was excellent in transparency.

When the polyester film used was contacted with absorbent cotton impregnated with a styrene monomer, the film was not changed by the styrene monomer at all. When the acrylic film was similarly tested, the contact portion was selectively dissolved within one minute.

Ten strip-like speciments each having a width of 25 mm were taken from the so-obtained composite film and the 180° peel strength was measured by a Tensilon tester according to the method of ASTM D 903-49. The peel strength was in the range of from 8 to 18 g/25 mm of the width in the ten specimens, and the average peel strength was 13.4 g/25 mm of the width.

Ten specimens having a size of 50 mm×50 mm were taken from a different part of the composite film, and the peeling state was examined with the naked eye. In all the specimens, peeling could easily be accomplished and the adhesive layer was not left on the acrylic film at all.

The composite film was spread on a glass sheet so that the acrylic film was located above, and according to customary procedures, 25 parts by weight of glass fibers (Chopped Strand 824A supplied by Asahi Fiber K.K.) were scattered on the surface of the acrylic film and 75 parts by weight of an unsaturated polyester syrup (RIGOLAC 1560L supplied by Showa Kobunshi K. K.) and 0.1 part by weight of benzoyl peroxide were cast on the glass fibers to impregnate the glass fibers with the unsaturated polyester syrup. Furthermore, another composite film was spread on the unsaturated polyester syrup so that the surface of the acrylic film was contacted with the syrup and a glass sheet was placed on the composite film so that the thickness of the laminate was 1 mm. The laminate was placed in a hot air circulating oven at 100° C. for 15 minutes and at 120° C. for 10 minutes to effect curing and polymerization. The cured product was then taken out from the oven and air-cooled at room temperature, and the glass sheets were then removed.

The polyester films, that is, carrier films, adhering to both the surfaces of the obtained FRP plate having a thickness of 1 mm, could easily be peeled and removed from the end portions thereof in the adhesive layer-adhering state, and the surfaces of the FRP plate after peeling of the polyester films were very smooth and were free of surface defects such as blobs or wrinkles.

For comparison, the so-obtained FRP plate (A) and a comparative FRP plate (B) which was prepared in the same manner as described above except that a biaxially drawn polyester film was used as a carrier film instead of the composite acrylic film were subjected to an accelerated exposure test for 1,000 hours, and the surface conditions of these FRP plates were examined. Formation of fine cracks, whitening and rising of glass fibers were observed on the surface of the comparative FRP plate (B) and the FRP plate per se was slightly yellowed. In contrast, no change was observed on the FRP plate (A). Ten cut lines were formed at intervals of 1 mm in either the longitudinal or lateral direction on the surface of the FRP plate (A) by a knife thereby to form 81 squares and an adhesive cellophane tape was applied to the cut surface, and the peel test was then carried out. None of squares were peeled from the surface of the FRP plate (A).

We claim:
1. In a process for preparing a laminate polymer article having an alkyl methacrylate polymer film uniformly laminated on at least one surface of the body of a polymer article formed from a prepolymer composition containing said prepolymer composition in combination with a polymerizable monomer, a solvent or a mixture thereof, the improvement comprising:
   laminating on the prepolymer composition a composite acrylic film comprising (i) a carrier film insoluble in the polymerizable monomer and the solvent and (ii) an alkyl methacrylate polymer film soluble in or swellable with the polymerizable monomer and the solvent, said carrier film and said alkyl methacrylate polymer film being adhered to each other through an adhesive layer capable of adhering relatively weakly to the alkyl methacrylate film and adhering relatively strongly to the carrier film and incapable of being dissolved in the polymerizable monomer and the solvent, so that the alkyl methacrylate polymer film is in contact with the surface of the prepolymer composition;
   polymerizing the prepolymer composition; and then, peeling the carrier film together with the adhesive layer from the resulting polymer article.

2. A process for the preparation of a laminate polymer article according to claim 1, wherein the prepolymer containing the polymerizable monomer, the solvent or the mixture thereof is a glass fiber-reinforced unsaturated polyester prepolymer containing a styrene monomer.

3. A process for the preparation of a laminate polymer article according to claim 1 or 2, wherein the carrier film is insoluble in a styrene monomer.

4. A process for the preparation of a laminate polymer article according to claim 3, wherein the carrier film is a saturated polyester film.

5. A process for the preparation of a laminate polymer article according to any one of claims 1, 2 and 4, wherein the adhesive layer is composed of a vinyl chloride/vinyl acetate/acrylic copolymer emulsion.

* * * * *